Patented July 6, 1948

2,444,571

UNITED STATES PATENT OFFICE 2,444,571

PROCESS FOR MAKING A PURIFYING AGENT FROM STEER BONES

Francis Leslie, Springfield, N. J.

No Drawing. Application April 24, 1947,
Serial No. 743,727

1 Claim. (Cl. 252—288)

This invention is an improved substance which has the property of purifying liquids and gases; and an improved method by which said substance or material is produced.

An important object of my invention is to provide a substance that is highly potent and efficient and capable of acting rapidly in removing and extracting impurities and foreign substances from water and other fluids; especially water for domestic and industrial use, when treated within a range of 34° F. to 180° F. by ordinary filtration. When the materal is correctly prepared and utilized in this manner, water, for example, is freed from chlorine, sulphur and other impurities, all traces of which are entirely eliminated, much more quickly than is possible with any other purifying agent heretofore available.

A further object of the invention is to provide a purifying agent for liquids and gases comprising bone black especially processed to divest it of all organic and mineral ingredients and then tempered to harden the material. In its final state it is very durable and can be employed for long periods without loss or decrease of its purifying powers or effect.

The nature and advantages of the invention are fully set forth hereinafter, but changes in details may be adopted without deviation from the principle thereof or omission of any of the distinguishing features wherein the invention resides.

I have found that the best raw materials are the bones of steers. These are burnt at least twice to consume fatty and fleshy accretions and other organic matter. The next step is to wash the burnt bones in perfectly soft water, free from color, taste, odor, organic matter and lime. Ten or twelve tanks of such water are employed. The bones are dropped into the first tank, and the dirt which floats up is scooped out, tilting the tank a little, if required. Then they are transferred to the second tank with a mesh basket and the operation is repeated in each remaining tank. The bones are now thoroughly clean, and freed of lime and other mineral compounds. The washed bones are next boiled in water at 212° F. The tanks must be thoroughly free from all greasy soaps or other chemicals. The boiling is performed in well aired surroundings, without smoke or gas fumes. Two tanks are filled with pure soft water, and heated till boiling commences. The bones are put into a wire mesh basket with openings of about $\frac{3}{32}$ inch, and of a size that can be dipped into the tank. After one minute the basket is lifted out and placed in the second tank for three to four minutes. This period of five minutes in all will open up all pores in the bone and liberate all organic matter left in the bones.

To temper and harden the bones chilling in pure soft water at 45° F. to 50° F. or colder is now performed. Three tanks of such cold pure water are made ready and the bones are lifted from the last hot dip and immediately transferred to the cold water. They are kept one minute in the first tank, drained, and then put into the second tank for two minutes and drained. Then they are at once dropped into the third tank and kept for two minutes. Five minutes in all are sufficient; then they are drained for five hours to dry.

The final step after drying is to bake the bones in an oven at 500° F. When the bones have drained and dried for five hours or more, they are spread out on a wire mesh tray having holes of $\frac{3}{32}$" by 6" to 8" in depth. The bones are allowed to bake for twenty minutes in the oven. Then they are put in a clean airy place to cool. This finishes the process. The product in its completed state has the form of small angular lumps or particles.

With a purifying agent as above described, all sulphur, chlorine and other objectionable substances can be taken out of water three or four times as quickly as with other known purifying agents. The substances last for a long time without spoiling or deteriorating, and the only noticeable difference is some loss of weight after continued use.

Having described my invention, what I believe to be new is:

The process of making a purifying agent which consists in burning steer bones, repeatedly washing the same in pure soft water, boiling the burnt bones by dipping them repeatedly in boiling water to extract further organic matter, tempering the bones by next dipping them repeatedly as soon as boiling is finished in water at 45° F. to 50° F., draining and drying said bones, and then baking in an oven for several hours in a temperature of 500° F.

FRANCIS LESLIE.

REFERENCES CITED

The following references are of record in the file of this patent:

UNITED STATES PATENTS

| Number | Name | Date |
|---|---|---|
| Re. 16,225 | Wooster | Dec. 15, 1925 |

FOREIGN PATENTS

| Number | Country | Date |
|---|---|---|
| 1,228 | Great Britain | May 14, 1864 |